(12) United States Patent
Huang et al.

(10) Patent No.: US 6,585,217 B2
(45) Date of Patent: Jul. 1, 2003

(54) ELECTRONIC INSTRUMENT SUPPORTING APPARATUS FOR USE WITH INPUT DEVICE

(75) Inventors: Mao-Sung Huang, Taoyuan (TW); Chien-Shih Hsu, Taipei (TW); Chin-Chen Li, Shinjuang (TW)

(73) Assignee: Darfon Electronics Corp., Taoyuan (TW)

( * ) Notice: Subject to any disclaimer, the term of this patent is extended or adjusted under 35 U.S.C. 154(b) by 0 days.

(21) Appl. No.: 10/142,023

(22) Filed: May 9, 2002

(65) Prior Publication Data

US 2002/0171020 A1 Nov. 21, 2002

(30) Foreign Application Priority Data

May 17, 2001 (TW) .................................... 090111813 A

(51) Int. Cl.[7] .................................................. A47G 1/24
(52) U.S. Cl. ........................................ 248/455; 248/918

(58) Field of Search .............................. 248/455, 346.01, 248/918, 919, 920, 921, 922

(56) References Cited

U.S. PATENT DOCUMENTS

| | | | | | |
|---|---|---|---|---|---|
| 5,632,373 A | * | 5/1997 | Kumar et al. | ................ | 206/305 |
| 6,008,983 A | * | 12/1999 | Yen | .............................. | 248/917 |
| 6,323,902 B1 | * | 11/2001 | Ishikawa | ..................... | 248/918 |

* cited by examiner

Primary Examiner—Ramon O. Ramirez
(74) Attorney, Agent, or Firm—Snell & Wilmer L.L.P.

(57) ABSTRACT

A supporting apparatus for use with an input device to support an electronic instrument is provided. The supporting apparatus includes a first unit and a supporter. The first unit is rotatably connected to a housing of the input device. When the supporting apparatus is in a closed state, the supporting apparatus covers the input device to protect the input device. When the supporting apparatus is in an open state, the supporting apparatus is automatically configured to a stable state capable of supporting an electronic instrument in one action.

12 Claims, 6 Drawing Sheets

ELECTRONIC INSTRUMENT SUPPORTING APPARATUS FOR USE WITH INPUT DEVICE

This application claims priority of Taiwan Patent Application Serial No. 90111813 filed on May 17, 2001.

FIELD OF INVENTION

The present invention generally relates to a supporting apparatus for use with an input device and, more particularly, to a supporting apparatus for use with an input device to support an electronic instrument.

BACKGROUND OF THE INVENTION

Since the advent of portable computers, more and more computer equipment of smaller size has been introduced in the market. As the size of such computers reduces, however, smaller input/output devices become increasingly in demand. Due at least in part to the inconvenience of using small input/output devices, many portable devices have not yet become as popular as originally expected. Accordingly, there is a trade-off between convenience and ease-of-use for portable electronic instruments.

Personal Digital Assistant (PDAs) such as those available from Palm, Handspring, Sony, Hewlett-Packard and others have become increasingly popular. Such PDAs typically have liquid crystal displays and, unlike conventional computers, are not typically equipped with conventional keyboards. Several conventional techniques exist for inputting data to a PDA. For example, many devices receive input information on a display panel by use of the pen input device or stylus to input data. Handwriting information from the user is typically stored as a bitmap, however, which takes up a relatively large amount of memory space and frequently degrades the performance of the PDA. Alternatively, many devices include a handwriting recognition software that changes handwriting information into ASCII or other codes that can be readily stored and processed. In some cases, the PDA has a virtual keyboard that is displayed on the display area whereby the user inputs data by selecting keys on the virtual keyboard using the pen stylus.

However, data input rates and responses of many PDA input processes are slow and insensitive compared with conventional keyboards. External keyboards have therefore been proposed as input devices for PDAs. When such external keyboards are not in use, the keyboard is detached from the PDA to improve portability and convenience. When data is being input with the external keyboard, the keyboard is typically connected to the PDA to improve input speed and comfortablility.

Another issue with external keyboards relates to physically supporting the palm-size and lightweight PDA, which is typically designed for hand-held use. When the PDA is put on a table, the PDA typically is not supported vertically, and the display angle may be difficult to adjust according to user's need. An external electronic instrument holder was therefore developed to support the PDA. Referring to FIG. 1, a conventional electronic instrument holder 11 is externally connected to one side of an input device 10. When the conventional holder 11 is placed into a closed position, the supporting portion 111 of the holder 11 is appropriately parallel to and overlapping with the holding portion 112. In another embodiment, holder 11 (which includes stacked supporting and holding portions 111 and 112), is appropriately parallel to input device 10 and is received in a corresponding slot input device 10. The procedure of arranging holder 11 in a closed configuration or an open configuration is typically complex and time consuming. It is therefore desirable to provide a supporting apparatus having the capability of supporting an electronic instrument that may also be easily converted from configuration to configuration.

SUMMARY OF THE INVENTION

The present invention is directed toward an electronic instrument supporting apparatus for use with an input device. In a first embodiment of the present invention, the supporting apparatus includes a first unit and a supporter. The first unit is rotatably connected to a housing of the input device. When the supporting apparatus is in a closed state, the first unit covers the input device to protect the input device from damage or contaminants. When the supporting apparatus is in an open state, the first unit and the supporter form a supporting configuration to support an electronic instrument.

In a second embodiment of the present invention, the supporting apparatus includes a first unit, a second unit, and at least one third unit, such as a body, a base, and at least one bar. When the supporting apparatus is in an open state, the supporting apparatus is automatically configured to a stable state capable of supporting an electronic instrument in one action. That is, the first, second, and third units form a supporting configuration to support an electronic instrument. Additionally, a groove is disposed on the second unit such that relative positions of the third unit and the second unit are adjustable to achieve a suitable supporting angle.

Various embodiments of the supporting apparatus further include a retaining device. When the supporting apparatus is in a closed state, the retaining device is engaged with the housing to prevent loose connection of the supporting apparatus and the input device. An elastic device can be disposed on the housing of the input device. When the elastic device is activated, the supporting apparatus is changed into the open state from the closed state, and the supporting apparatus automatically forms a supporting configuration to support an electronic instrument.

BRIEF DESCRIPTION OF THE DRAWINGS

The foregoing aspects and many of the attendant advantages of this invention will become more readily appreciated by reference to the following detailed description when taken in conjunction with the accompanying drawings, wherein.

DETAILED DESCRIPTION

Figure 1:
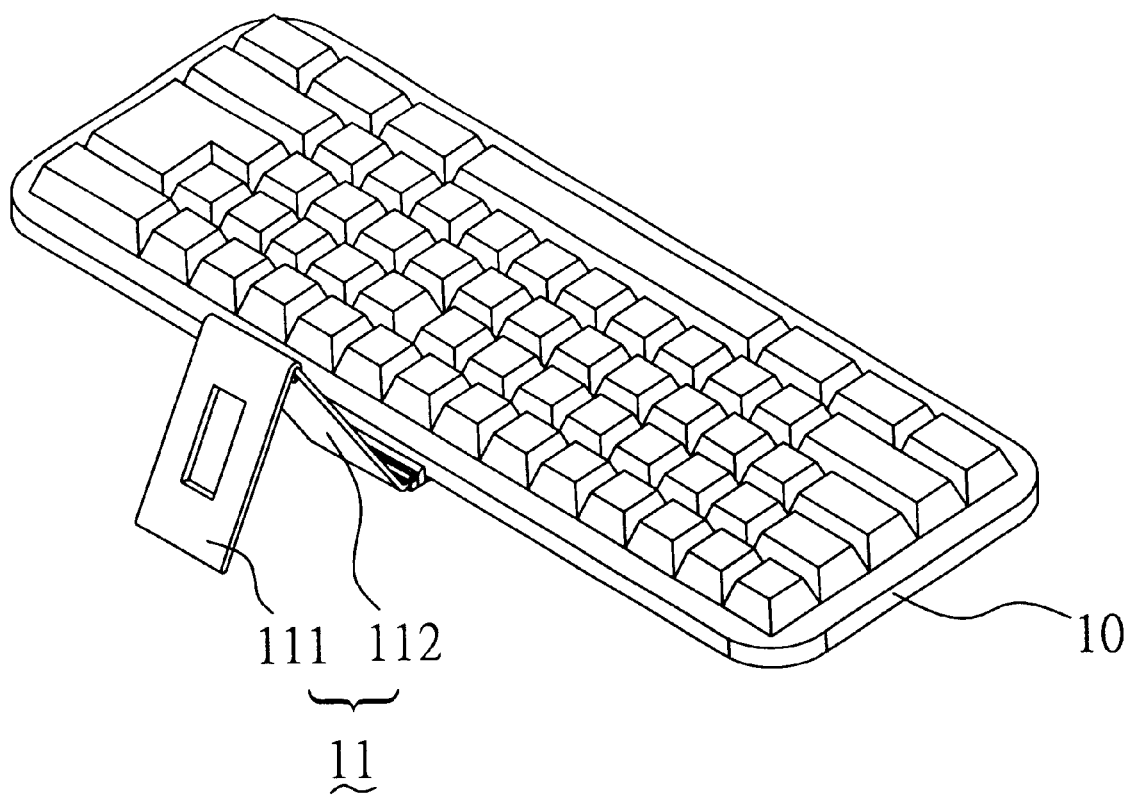
FIG. 1 is a schematic view illustrating a conventional electronic instrument holder cooperated with an input device.
Figure 2:
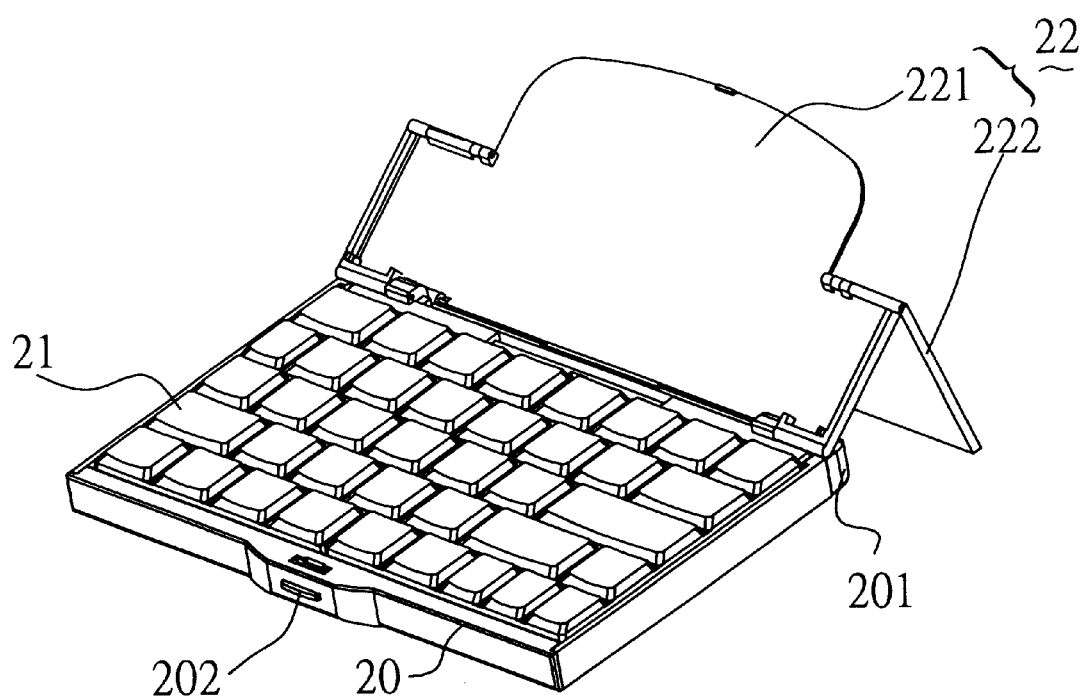
FIG. 2 is a schematic view illustrating a supporting apparatus in the open state of a first exemplary embodiment of the present invention.

In accordance with various embodiments of the present invention, an electronic instrument supporting apparatus for use with an input device is provided. Referring to FIG. 2, in a first exemplary embodiment of the present invention, the supporting apparatus 22 in an open state is illustrated. The supporting apparatus 22 includes a first unit 221, such as a covering body, and a supporter 222. Supporting apparatus 22 is used with an input device having a housing 20 and an input unit 21. Housing 20 includes a rear housing 201. Input unit 21 is disposed in the housing 20. One end of first unit 221 is rotatably connected to the rear housing 201, as appropriate. First unit 221 is rotatably connected to supporter 222 by a connecting device, such as a hinge. When first unit 221 and housing 20 are engaged in an open state, supporter 222 supports first unit 221, and a supporting angle between first unit 221 and housing 20 is formed such that first unit 221 supports the electronic instrument such as a PDA. When first unit 221 and housing 20 are engaged in a closed state, first unit 221 covers input unit 21 to protect the input device from damage.

Figure 3:
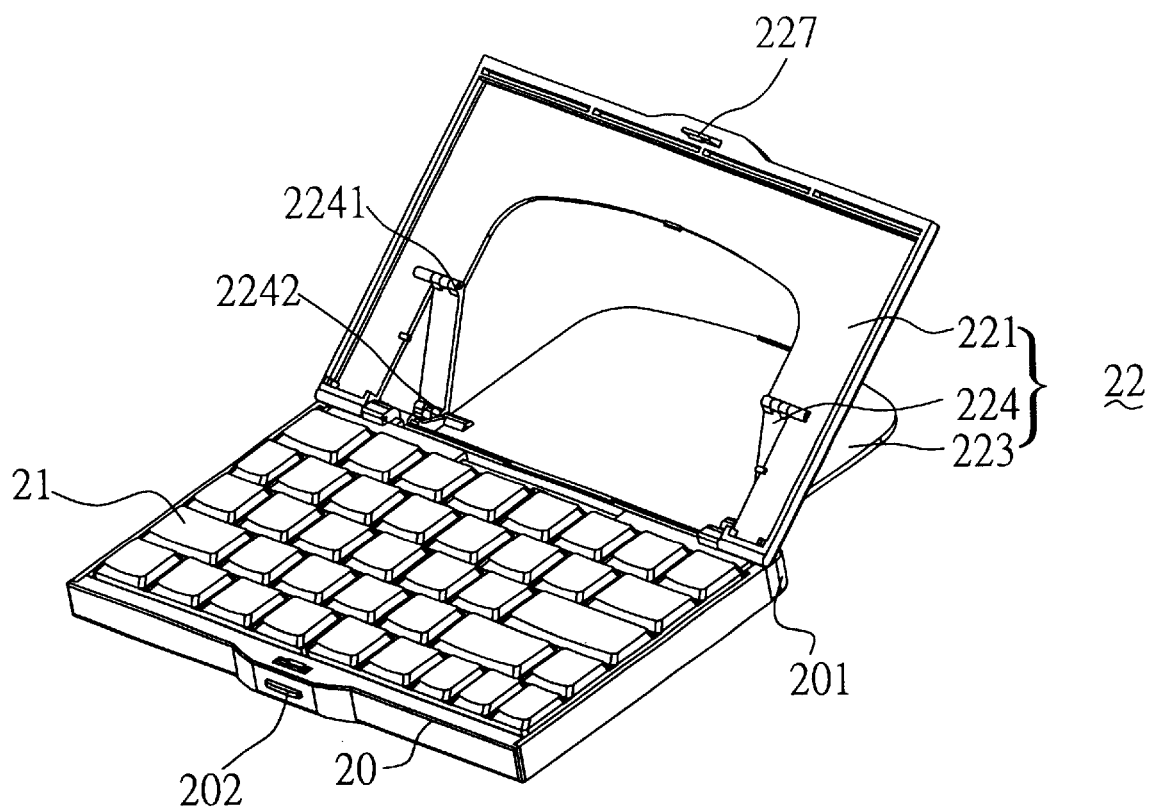
FIG. 3 is a schematic view illustrating a supporting apparatus in the open state of a second exemplary embodiment of the present invention.

Referring now to FIG. 3, in a second exemplary embodiment, a supporting apparatus in an open state is illustrated. Supporting apparatus 22 of the second embodiment includes a first unit 221, such as a covering body, a second unit 223, such as a base, and at least a third unit 224 such as a connecting bar. Supporting apparatus 22 may be used with an input device having a housing 20 and an input unit 21. Housing 20 includes a rear housing 201. Input unit 21 is disposed in housing 20. First unit 221 is connected to second unit 223 by third unit 224, as appropriate. Third unit 224 appropriately includes a first end 2241 and a second end 2242. First unit 221 is rotatably connected to first end 2241 by a connecting device, such as a hinge. Second end 2242 may be rotatably connected to second unit 223 by a connecting device, such as a hinge. When the first, second, and third units (221, 223, and 224) are in the open state, third unit 224 supports first unit 221 to form a suitable supporting angle between first unit 221 and housing 20 such that the first unit 221 supports an electronic instrument. Second unit 223 is used to increase the contact area between the input device and the surface of where the input device is placed on, such as table, to provide a stable state capable of holding and preventing the electronic instrument from overturn due to the relative heavy weight.

Supporting apparatus 22 is appropriately moved relative to an elastic device 202, which is suitably disposed on housing 20 of the input device, as shown in FIG. 3. When elastic device 202 is activated, supporting apparatus 22 is changed into the open state from the closed state due to the elastic force; hence the first, second, and third units (221, 223, and 224) form a supporting configuration. Supporting apparatus 22 further may also include a retaining device 227, such as a latch. When the first, second, and third units (221, 223, and 224) are in the closed state, retaining device 227 is engaged with housing 20 to prevent relative motion of supporting apparatus 22 and the input device due to loose connection.

Figure 4:
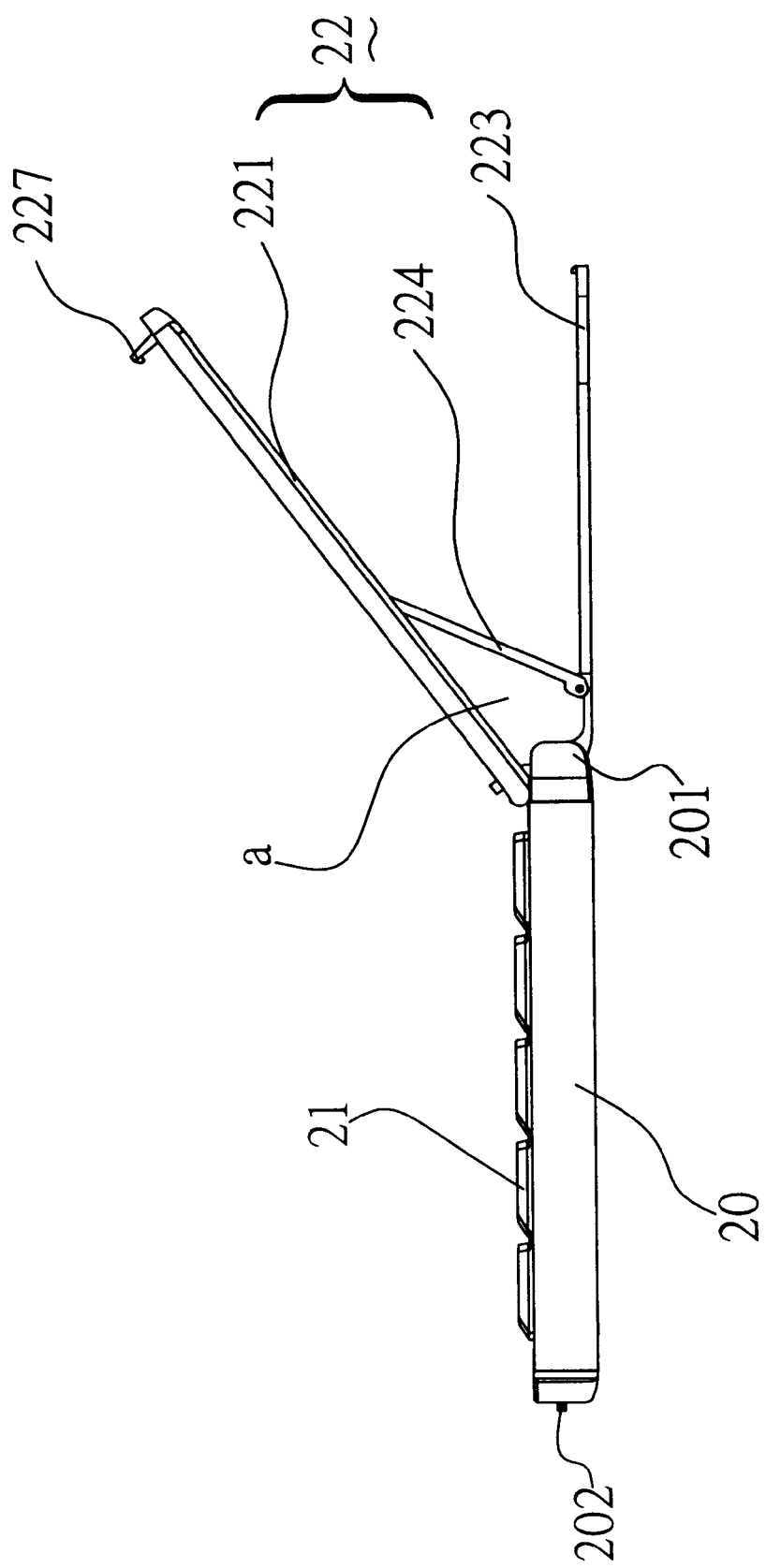
FIG. 4 is a schematic side view illustrating the supporting apparatus in FIG. 3.

Referring to FIG. 4, a schematic side view of supporting apparatus 22 of FIG. 3 is illustrated. Any one of the first unit 221, the second unit 223, and the third unit 224 moves in response to the movement of the other units 221, 223, and 224. First unit 221, second unit 223, third unit 224, and rear housing 201 suitably forms a quadrilateral as indicated. First unit 221 may be rotatably connected to third unit 224, as shown. Third unit 224 may be rotatably connected to second unit 223. Second unit 223 is rotatably connected to rear housing 201. Rear housing 201 is rotatably connected to first unit 221, as appropriate. When the supporting apparatus is in the open state, the supporting apparatus is automatically configured to a stable state capable of supporting an electronic instrument in one action, as shown.

Figure 5:
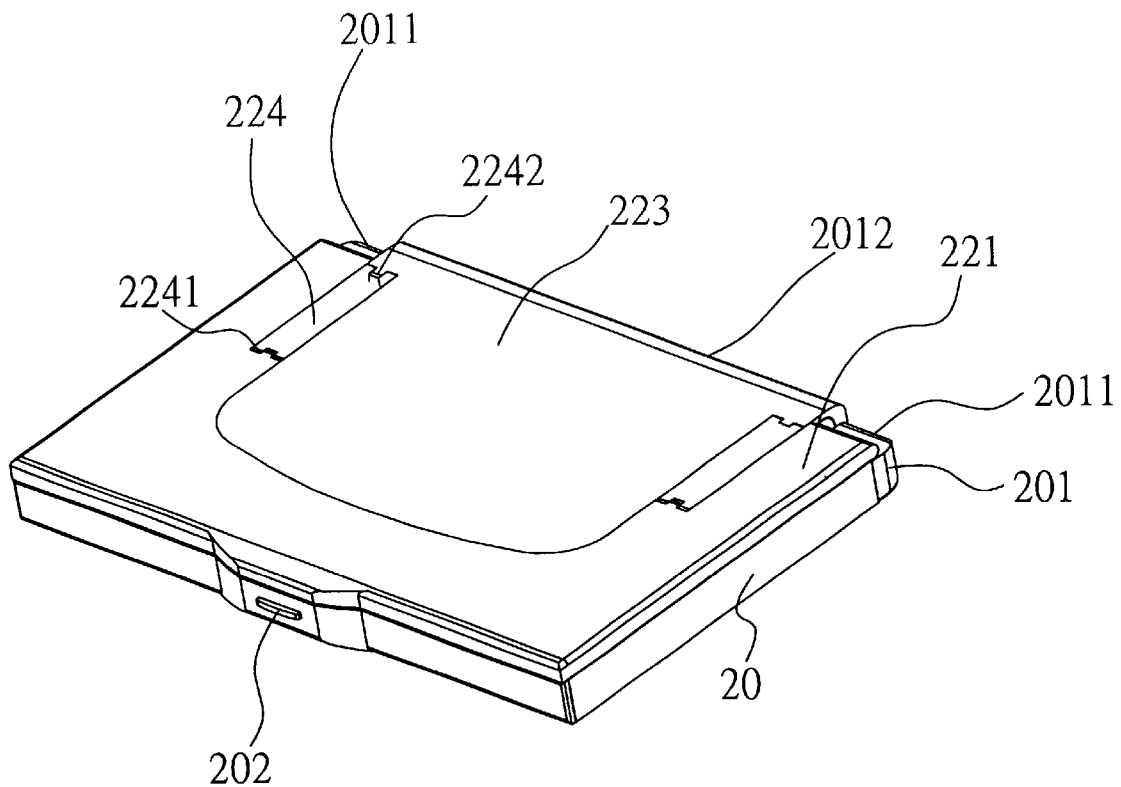
FIG. 5 is a schematic view illustrating the supporting apparatus in the closed state of a second exemplary embodiment of the present invention.

FIG. 5 shows the supporting apparatus 22 of FIG. 3 in the closed state. Rear housing 201 of the input device includes a first rear housing 2011 and a second rear housing 2012. First unit 221 is connected to first rear housing 2011, and second unit 223 is connected to second rear housing 2012, as shown When supporting apparatus 22 is in the closed state, then first unit 221, second unit 223, and third unit 224 are substantially in a plane to cover and protect input unit 21. Alternatively, first unit 221, second unit 223, and third unit 224 may be designed to be partially overlapped or out of the same plane in other embodiments.

Figure 6:
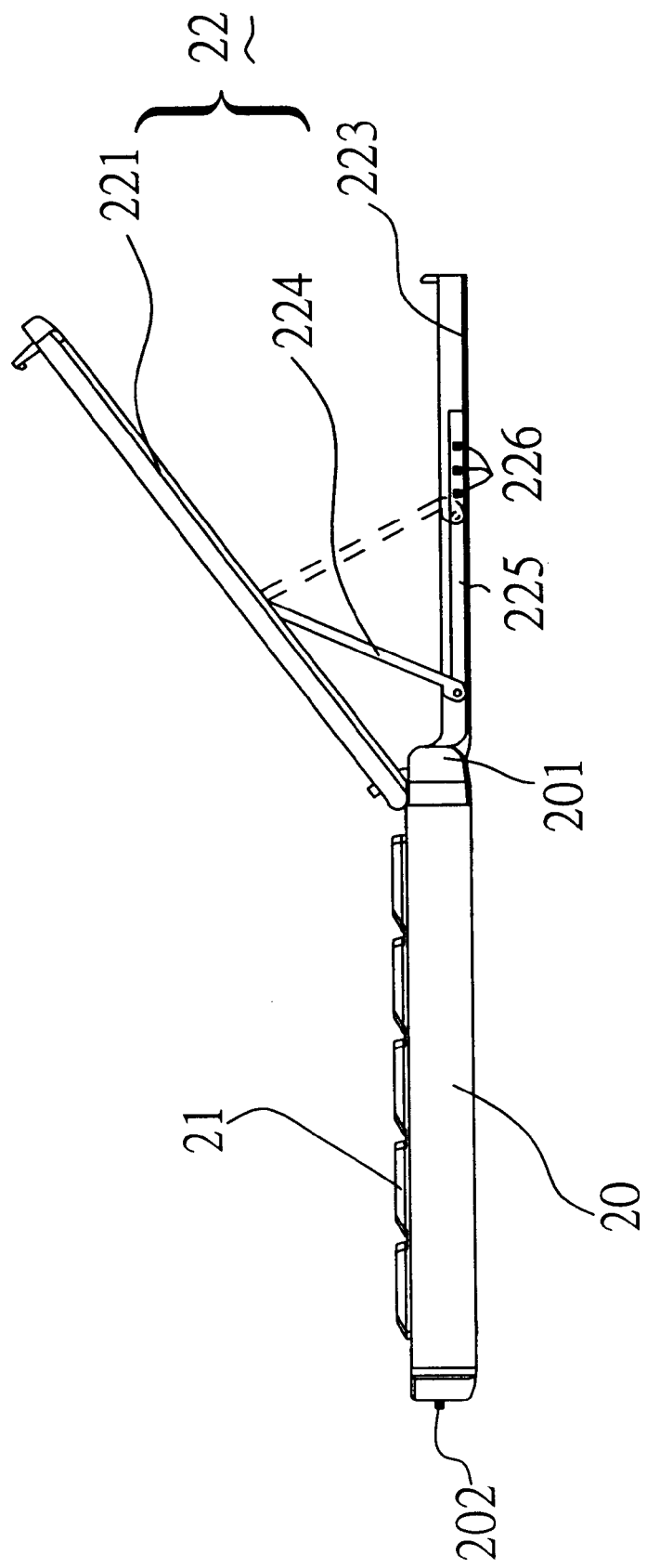
FIG. 6 is a schematic side view illustrating a supporting apparatus in the open state of a third exemplary embodiment of the present invention.

FIG. 6 is a schematic side view of a supporting apparatus 22 of a third exemplary embodiment of the present invention. Second unit 223 is rotatably and slidably connected to the third unit 224, as shown. Second unit 223 has a groove 225 for accommodating a slidable portion (not shown) of third unit 224. When supporting apparatus 22 is in the open state, third unit 224 slides along groove 225 to a suitable supporting angle to support first unit 221. An angle adjustment device 226 is disposed in groove 225 for adjusting the angle between third unit 224 and second unit 223 to support an electronic instrument. Angle adjustment device 226 may be a plurality of protrusions to retain the slidable portion of third unit 224 on a certain location.

The supporting apparatus of the present invention suitably includes at least a first unit 221, a supporter 222, a second unit 223, and a third unit 224, as appropriate. The particular shape of each component of the supporting apparatus may vary from embodiment to embodiment. Further, the various embodiments may have any number of components. Functions of first unit 221 and second unit 223 are appropriately interchangeable. That is, when the supporting apparatus is in the open state, first unit 221 serves as a base parallel to the bottom of housing 20, and second unit 223 serves as a supporter to support an electronic instrument, as appropriate.

The supporting apparatus may be configured to a stable state capable of supporting a small size electronic instrument on a table when the supporting apparatus is in the open state. The apparatus also covers and protects the input device when in the closed state. Therefore, the supporting apparatus has the advantages of easy operation and timesaving convenience. The supporting apparatus of various embodiments can not only protect the input unit, but also adjust the angle of view of the electronic instrument. The input unit may be any type of keyboard or writing pad, or other device as appropriate. The electronic instrument may be a personal digital assistant, or any small size electronic device required an external input device, such as a mobile phone, global positioning system, digital pager, or the like.

Although specific embodiments have been illustrated, it will be apparent that various modifications may be made without departing from what is intended to be limited solely by the appended claims.

What is claimed is:

1. A supporting apparatus for use with an input device, said input device having a housing, the supporting apparatus comprising:

a first unit rotatably connected to one side of said housing;

a second unit; and a third unit;

wherein said first unit is rotatably connected to a first end of said third unit, and said second unit is rotatably and slidably connected to a second end of said third unit, and wherein when said first unit and said housing are engaged in a first configuration, said third unit supports said first unit and said first unit is used to support an electronic instrument, and when said first unit and said housing are engaged in a second configuration, said first unit, said second unit, and said third unit cover said input device.

2. The supporting apparatus according to claim 1, wherein said second unit comprises a groove for accommodating said second end of said third unit.

3. The supporting apparatus according to claim 2, wherein an angle adjustment device is disposed in said groove to adjust an angle between said third unit and said second unit.

4. The supporting apparatus according to claim 1, said first unit further comprising a retaining device, and wherein said retaining device is engaged with said housing when said first unit and said housing are in the second configuration.

5. The supporting apparatus according to claim 1, wherein said housing further comprises an elastic device, and wherein said first unit and said housing are changed into the first configuration from the second configuration when said elastic device is activated.

6. A supporting apparatus for an input device, wherein said input device having a housing, said supporting apparatus comprising:
   a first unit rotatably connected to said housing;
   a second unit rotatably connected to said housing; and
   a third unit having a first end and a second end, said first end connected to said first unit, said second end connected to said second unit;
   wherein at least one of said first unit, said second unit, and said third unit moves responsive to movement of rest of said first unit, said second unit, and said third unit.

7. The supporting apparatus according to claim 6, wherein, when said first, second, and third units are in a first configuration, said first unit is used to support an electronic instrument, and when said first, second, and third units are in a second configuration, said first, second, and third units form a substantially plane.

8. The supporting apparatus according to claim 7, said first unit further comprising a retaining device engaged with said housing when said first, second, and third units are in the second configuration.

9. The supporting apparatus according to claim 8, wherein said input device further comprises an elastic device, wherein, said first, second, and third units are changed into the first configuration from the second configuration when said elastic device is activated.

10. The supporting apparatus according to claim 6, wherein said first unit is rotatably connected to said first end of said third unit and said second unit is rotatably and slidably connected to said second end of said third unit.

11. The supporting apparatus according to claim 10, wherein said second unit comprises a groove accommodating said second end of said third unit.

12. The supporting apparatus according to claim 11, wherein an angle adjustment device is disposed in said groove to adjust an angle between said second and third units.

* * * * *